(12) United States Patent
Imai et al.

(10) Patent No.: US 8,711,133 B2
(45) Date of Patent: Apr. 29, 2014

(54) ELECTRONIC DEVICE, DISPLAY, IMAGE PROCESSING APPARATUS AND ELECTRONIC CALCULATING APPARATUS

(75) Inventors: Akira Imai, Kawasaki (JP); Taisuke Omi, Hadano (JP); Yoshiaki Nishizaki, Kawasaki (JP); Kazuo Koike, Yokohama (JP); Kenichi Yamada, Ebina (JP); Tasuku Kohara, Sagamihara (JP); Tsuyoshi Endoh, Sagamihara (JP); Hiroshi Takeda, Funabashi (JP); Hiroki Tsuruoka, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 327 days.

(21) Appl. No.: 13/045,114

(22) Filed: Mar. 10, 2011

(65) Prior Publication Data
US 2011/0221735 A1    Sep. 15, 2011

(30) Foreign Application Priority Data
Mar. 11, 2010    (JP) .................................. 2010-054069

(51) Int. Cl.
*G06F 3/038*    (2013.01)
*G09G 5/00*    (2006.01)

(52) U.S. Cl.
USPC ............................. 345/211; 257/40; 136/263

(58) Field of Classification Search
USPC .......................................... 345/211, 173–183
See application file for complete search history.

(56) References Cited

U.S. PATENT DOCUMENTS

| 7,667,685 B2 | 2/2010 | Yamada et al. |
| 7,684,721 B2 | 3/2010 | Kohara et al. |

(Continued)

FOREIGN PATENT DOCUMENTS

| JP | 10-48358 | 2/1998 |
| JP | 2004-102677 | 4/2004 |

(Continued)

OTHER PUBLICATIONS

Chinese Office Action issued Apr. 25, 2013, in China Patent Application No. 201110062251.9 (with English translation).

(Continued)

*Primary Examiner* — Kevin M Nguyen
*Assistant Examiner* — Kenneth B Lee, Jr.
(74) *Attorney, Agent, or Firm* — Oblon, Spivak, McClelland, Maier & Neustadt, L.L.P.

(57) ABSTRACT

Provided are a control panel or a display as well as an image processing apparatus and an electronic calculating apparatus using the electronic device or the display, the electronic device and the display each using a light transmissive solar cell for electric power generation so as to allow a solar cell part and a display part to be disposed to overlap an input part so that a larger electric power than the conventional cases can be generated without increasing the size of the whole operation panel and the whole display. An electronic device of the present invention includes: a display part capable of electrically and magnetically changing a display region and displaying of a display content displayed in the display region; a solar cell part that transmits light in a visible light region; and an input part that detects whether or not any part of the display region is manipulated, and that transmits light in a visible light region. The solar cell part and the input part are disposed on a display surface side of the display part in such a manner to form layers. An electric power generated by the solar cell part allows the electronic device to change what is displayed in the display part and detect a manipulation of the input part.

13 Claims, 7 Drawing Sheets

(56) References Cited

U.S. PATENT DOCUMENTS

| | | |
|---|---|---|
| 7,787,794 B2 | 8/2010 | Yamada et al. |
| 2007/0059032 A1 | 3/2007 | Yamada et al. |
| 2007/0154876 A1* | 7/2007 | Harrison, Jr. ............... 434/365 |
| 2009/0060612 A1 | 3/2009 | Kohara et al. |
| 2009/0066644 A1 | 3/2009 | Endoh et al. |
| 2009/0316193 A1 | 12/2009 | Kohara et al. |
| 2009/0316954 A1 | 12/2009 | Kohara et al. |
| 2010/0079387 A1* | 4/2010 | Rosenblatt et al. .......... 345/173 |
| 2010/0155575 A1* | 6/2010 | Lundin ...................... 250/206 |

FOREIGN PATENT DOCUMENTS

| | | |
|---|---|---|
| JP | 2007-065020 | 3/2007 |
| JP | 3983911 | 7/2007 |
| JP | 2008-305199 | 12/2008 |

OTHER PUBLICATIONS

Office Action issued Oct. 8, 2013 in Japanese Patent Application No. 2010-054069.

* cited by examiner

ELECTRONIC DEVICE, DISPLAY, IMAGE PROCESSING APPARATUS AND ELECTRONIC CALCULATING APPARATUS

CROSS-REFERENCE TO THE RELATED APPLICATION

This application is based on and claims the priority benefit of Japanese Patent Application No. 2010-054069, filed on Mar. 11, 2010, the contents of which are incorporated herein by reference.

BACKGROUND OF THE INVENTION

1. Field of the Invention

The present invention relates to an operation panel of an image forming apparatus or an image processing apparatus, such as a copying machine, as well as an operation panel of a mobile phone and the like. Specifically, the present invention relates to an electronic device including an operation panel for inputting and outputting information, and to an electronic device that can be suitably used in an image processing apparatus, an electronic calculating apparatus, and the like.

2. Description of the Related Art

As electronic devices, for example, liquid crystal displays of so-called calculators that use solar cells have been conventionally known (for reference, see Japanese Patent No. 3983911).

With such conventional liquid crystal displays, the calculation function and the display function can be performed, without charging means or the like, by using an electric power generated by the solar cell, as long as there is a luminance approximately at the level of a household illumination.

As shown in FIG. 1, in a so-called calculator 1 of the conventional type, its input part (operation part) 2, solar cell part 3 and display part 4 are arranged without overlapping each other. In a case of employing a display equipped with a solar cell, the solar cell part 3 and the display part 4 cannot be arranged in an overlapping manner because solar cells generate an electric power by absorbing visible light. Thus, there is a restriction on arrangement space.

SUMMARY OF THE INVENTION

Generally, in order to obtain a large electric power in electric power generation using a solar cell, the area of the solar cell needs to be as large as possible.

However, in a case of employing a so-called non-light-transmissive solar cell that absorbs visible light to generate an electric power, the display part 4 and the operation part 2 cannot be arranged in a manner to overlap the solar cell part 3. Thus, in order to secure a large area for the solar cell, the area occupied by the solar cell part 3 has to be large. This inevitably increases the size of the electronic device using the operation panel and the display, and also imposes some limitation on the design of the electronic device.

In the meanwhile, use of a non-rechargeable battery (alkaline battery or the like) may eliminate the possibility of increase in size even when a large electric power is to be obtained. However, non-rechargeable batteries have to undergo waste treatment in the end, which is a serious problem in light of our global environmental issues and energy issues. In contrast, when a rechargeable battery is used, this battery needs to be charged by receiving a supply of an electric power from an external power source. This is problematic in view of energy saving.

The present invention has been made in consideration of all the above circumstances, and it is an object to provide an electronic device and a display as well as an image processing apparatus and an electronic calculating apparatus using the electronic device and the display, the electronic device and the display each using a light transmissive solar cell for electric power generation so as to allow a solar cell part and a display part to be disposed to overlap an input part so that a larger electric power than the conventional cases can be generated without increasing the size of the whole operation panel and the whole display.

The present invention resides in a configuration which uses a light transmissive solar cell for the solar cell part to thereby allow the solar cell part to be disposed to overlap the input part or the display part.

BRIEF DESCRIPTION OF DRAWINGS

FIG. 12A is a plan view showing an example where an operation panel unit according to the present invention is applied to an electronic desk-top calculating apparatus (calculator). FIG. 12B is a cross-sectional view taken along the B-B line of FIG. 12A.

DETAILED DESCRIPTION OF THE PREFERRED EMBODIMENTS

Figure 2:
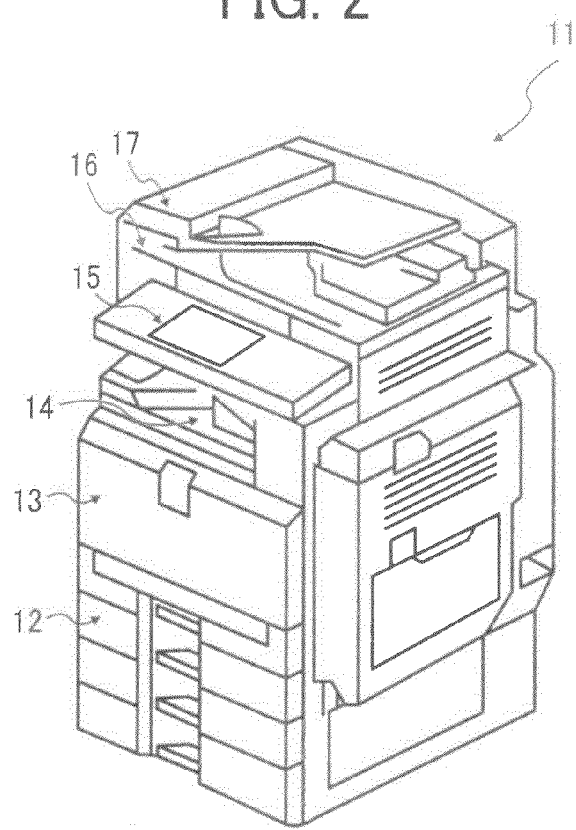
FIG. 2 is an external view showing an example of an image forming apparatus according to the present invention.

FIG. 2 is an external view showing an overall configuration of a copying machine being an image processing apparatus (image forming apparatus) according the present invention.

In FIG. 2, reference number 11 denotes an image processing apparatus (MFP (Multi Function Printer)). The image processing apparatus 11 is constituted mainly of a sheet feed tray unit 12, a printer unit 13, a sheet discharge tray unit 14, an operation panel unit 15, a scanner unit 16, and automatic document feeder unit (ADF unit) 17.

Figure 3:
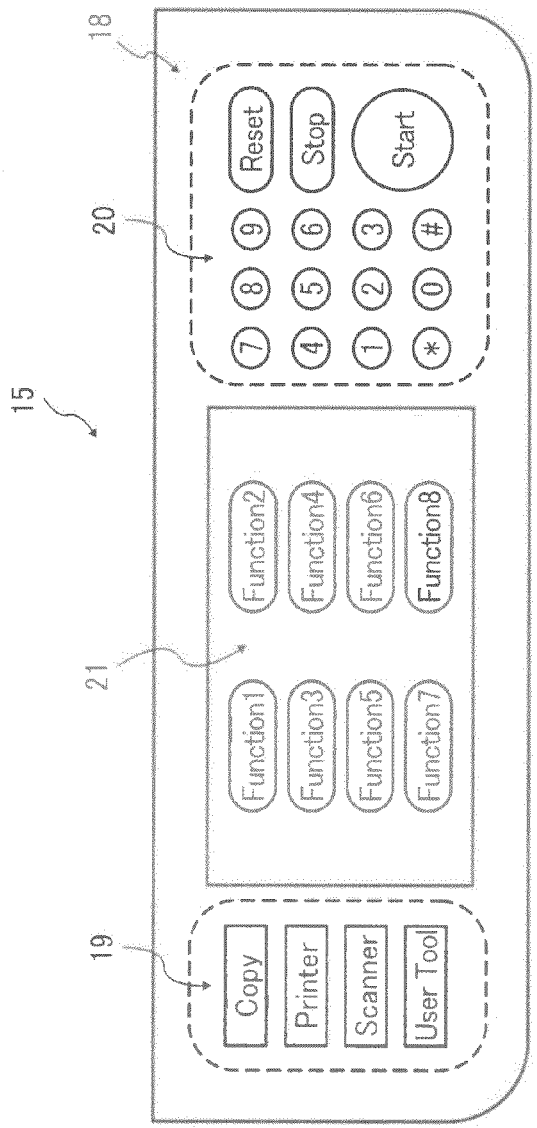
FIG. 3 is a layout drawing showing an example of an operation panel provided to an operation panel unit shown in FIG. 2.

According to a conventional configuration, the operation panel unit 15 would be constituted mainly of a casing part 18, mechanical switch parts 19 and 20 formed of push buttons or the like, and a touchscreen panel type LCD display part 21, as shown in FIG. 3.

FIG. 3 illustrates a state where various function switches are displayed in the LCD display part 21 with English letters.

In the state shown in FIG. 3, when a button in the mechanical switch part 19 such as the Copy button or the Printer button is pushed and selected, the display state of the LCD display part 21 is changed to display contents such as print-size select buttons, color/monochrome select buttons, and/or enlarge/reduce select buttons.

When the operator touches the select buttons shown as the display contents in the LCD display part 21, the image processing apparatus 11 is set into a state where a process corresponding to the touched content is ready to be executed.

In addition, when, for example, a numeric keypad in the mechanical switch part 20 is manipulated, the number of copies to be printed or the like is displayed in the LCD display part 21 as an input value.

Figure 4:
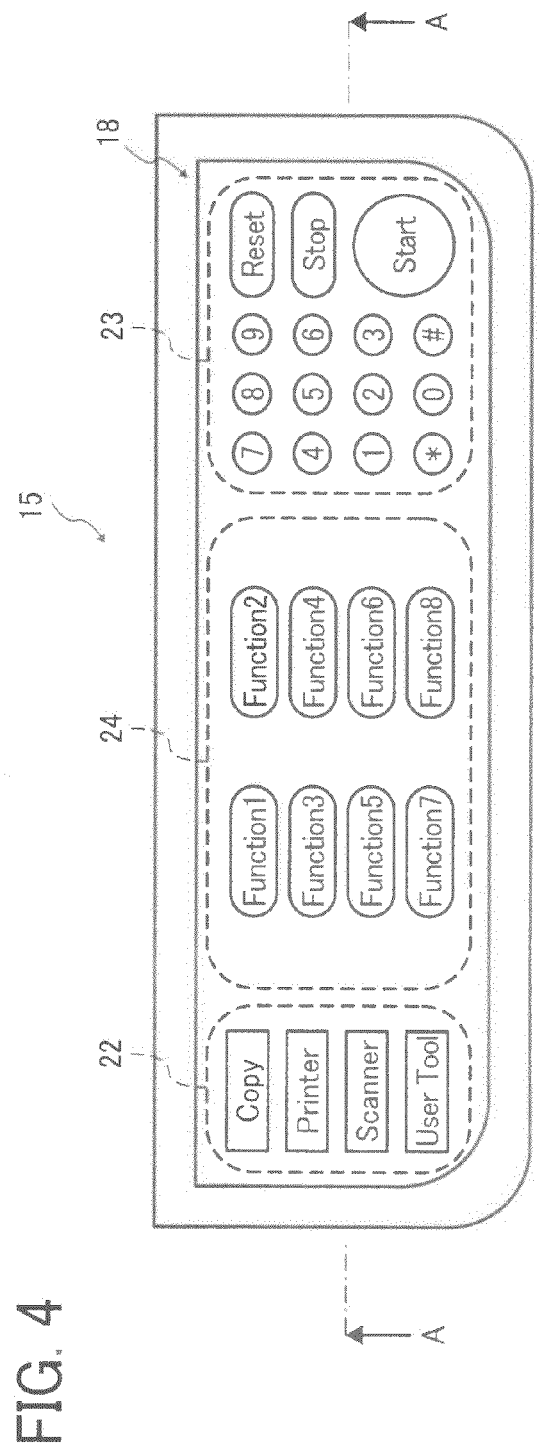
FIG. 4 is a layout drawing showing an example of an operation panel according to the present invention, which is provided to the operation panel unit shown in FIG. 2.

The operation panel unit 15 in each example of the present invention is formed of a touchscreen panel type liquid crystal display part (LCD display part) as shown in FIG. 4, for example. The operation panel unit 15 is constituted of a left operation panel part 22, a right operation panel part 23, and a center operation panel part 24. The functions of the left operation panel part 22, the right operation panel part 23 and the center operation panel part 24 correspond respectively to those of the mechanical switch part 19, the mechanical switch part 20, and the LCD display part 21 for the sake of convenience of the description, but are not limited thereto.

Hereinbelow, examples of the operation panel unit 15 according to the present invention will be described in detail.

(Embodiment 1)

Figure 5:
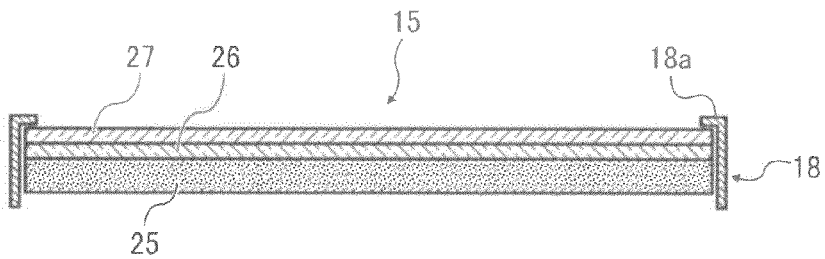
FIG. 5 is a cross-sectional view of an operation panel unit according to Example 1 of the present invention, and is a cross-sectional view taken along the A-A line of FIG. 4.

As shown in FIG. 5, the casing part 18 is provided with a liquid crystal display part 25. This display part 25 is provided with a solar cell part 26 on the display surface side thereof. The solar cell part 26 is provided with an input part 27 on the upper surface thereof.

A so-called transparent solar cell is used for the solar cell part 26. This transparent solar cell is said to be manufacturable by use of a wide-bandgap oxide semiconductor. There has been manufactured, for example, a solar cell that has a visible-light transmittance of about 50% and is capable of generating an electric power from light in an ultraviolet light region (wavelength of 350 to 450 nm) (see the website of the National Institute of Advanced Industrial Science and Technology).

The power generation efficiency of that transparent solar cell in the ultraviolet light region is said to be 2% to 3%. By making the solar cell transparent in the visible light region, the power generation efficiency thereof is lower than a power generation efficiency of approximately 18% of a conventional solar cell that does not transmit the visible light. Nonetheless, such a power generation efficiency is still large enough to be utilized for certain electronic devices. In addition, the amount of electric power to be generated can be increased by increasing the area in which the solar cell is disposed. Accordingly, it is possible to manufacture an electronic device having an equivalent performance to that of a conventionally-used typical solar cell.

Moreover, it is conceivable to utilize not only the ultraviolet light region but also part of the infrared light region and part of the visible light region. Hence, transparent solar cells that transmit light in the visible light region are expected to be further improved in the future in power generation efficiency as well as transparency.

Note that in the present invention, a "transparent" solar cell means a solar cell with such a transparency that the solar cell can transmit at least part of light in the visible light region and that a part covered underneath the solar cell is visible with the naked eyes. The term "transparent" does not mean that the solar cell part 26 transmits light in the visible light region by 100%.

For the display part 25, used is an LCD low in power consumption, a light-emitting type organic EL, electronic paper, or the like.

The display part 25 is capable of electrically and magnetically changing a display region and the displaying of the display contents displayed in the display region.

There are various types of electronic papers, and they may consume substantially no electric power except when the display content is switched, whereby the display state can be maintained without electricity, unlike LCDs.

For the input part 27, used is a transparent touchscreen panel that detects whether or not any part of the display region in the display part 25 is manipulated, and that transmits light in the visible light region.

This touchscreen panel is of: a capacitive type that detects a change in capacitance; a resistive film type that detects a change in resistance caused by pressing; or the like.

Which type of touchscreen panel should be used is determined in consideration of use of the operator's fingers, use of a pen, outdoor use, the importance of durability, and the like, which depend on the use environment and so on.

In FIG. 5, the input part 27 is provided at the top surface. Thus, if the manipulation is to be performed with the operator's fingers, a capacitive type is desirable. On the other hand, if the transparent solar cell is provided at the top surface as will be described later, a resistive film type or the like is desirable.

The operation panel unit 15 is constituted of the casing 18, the display part 25, the transparent solar cell part 26, and the input part 27 as described above. Further, the solar cell part 26 and the input part 27 are disposed in such an overlapping manner to form layers in this order on the top surface side of the display part 25, whereby a large occupied area is secured for the solar cell part 26.

Moreover, the arrangement can be such that the electric power generated by the solar cell part 26 allows at least one of the changing of what is displayed in the display part 25 and the detecting of a manipulation of the input part 27.

(Embodiment 2)

Figure 6:
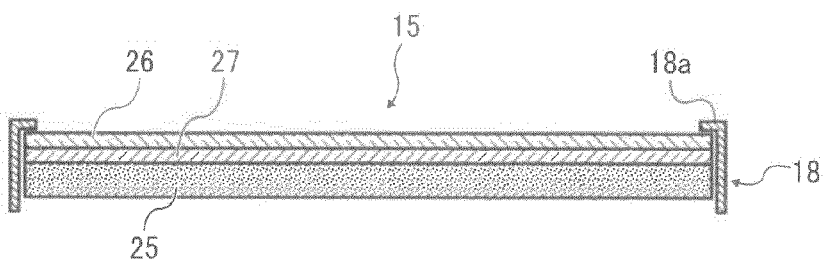
FIG. 6 is a cross-sectional view of an operation panel unit according to Example 2 of the present invention, and is a cross-sectional view taken along the A-A line of FIG. 4.

FIG. 6 is a cross-sectional view of an operation panel unit 15 according to Example 2 of the present invention, and is a cross-sectional view taken along the A-A line of FIG. 4. In FIG. 6, the input part 27 and the solar cell part 26 are disposed in such a manner to form layers in this order on the top surface side of the display part 25.

In the case of Example 2, since the input part 27 is a touchscreen panel, a flexible substrate is desirably used for the solar cell part 26, rather than a glass substrate.
(Embodiment 3)

Figure 7:
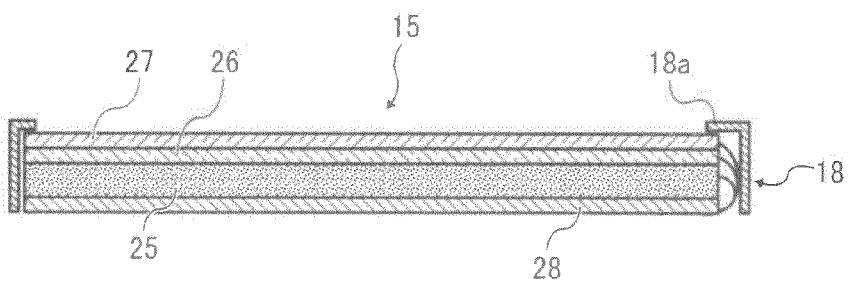
FIG. 7 is a cross-sectional view of an operation panel unit according to Example 3 of the present invention.

FIG. 7 is a cross-sectional view of an operation panel unit 15 according to Example 3 of the present invention. In Example 3, an electric control circuit part 28 formed of a control part, a storage part, a communication part, and a charge part is disposed at the back of a stacked body formed of the display part 25, the solar cell part 26, and the input part 27.

The electric control circuit part 28 is connected by wires to the display part 25, the solar cell part 26, and the input part 27.

In this configuration, the operation panel unit 15 is not equipped with the mechanical switch parts 19 and 20. Hence, although the electric control circuit part 28 is provided at the back of the display part 25, it is possible to produce an operation panel unit that is thinner than the aforementioned conventional operation panel unit 15.

Accordingly, it is possible to form a thin, single electronic device that can perform at least one of the changing of what is displayed in the display part 25 and the detecting of a manipulation of the input part 27 by use of the electric power generated by the solar cell part 26.

The storage part holds or stores display state information containing information on the display region in the display part 25 and information on the contents to be displayed in the display region.

The control part functions as a display control part that detects a manipulation of the input part 27 and changes the display state of the display part 25 on the basis of the display state information.

The display control part detects, through the input part 27, a manipulation corresponding to the display contents currently displayed in the display region and changes the display state of the display part 25 on the basis of the display state information.

For example, in FIG. 4, upon manipulation of the Copy button, the display control part changes the display contents currently displayed in the center operation panel part 24, which serves as the display region, from the function switches to print-size select buttons.
(Embodiment 4)

Figure 8:
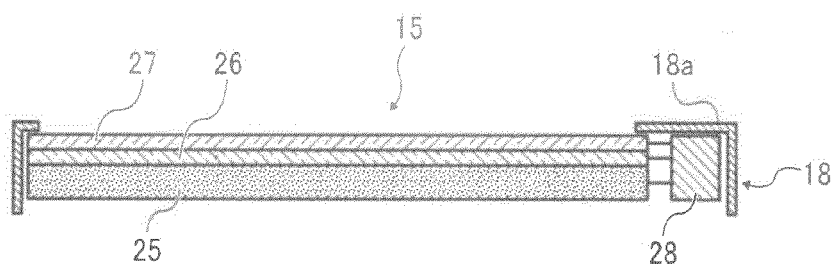
FIG. 8 is a cross-sectional view of an operation panel unit according to Example 4 of the present invention.

FIG. 8 is a cross-sectional view of an operation panel unit 15 according to Example 4 of the present invention. In Example 4, the electric control circuit part 28 is disposed at a lateral side of the stacked body formed of the display part 25, the solar cell part 26, and the input part 27, and is hidden by an exterior top surface portion 18a of the casing 18.

According to this configuration, even in the case of the configuration in which the operation panel unit 15 is provided with the electric control circuit part 28, it is possible to produce an operation panel unit that is further thinner than the configuration in which the electric control circuit part 28 is provided at the back of the stacked body formed of the display part 25, the solar cell part 26, and the input part 27.
(Embodiment 5)

Figure 9:
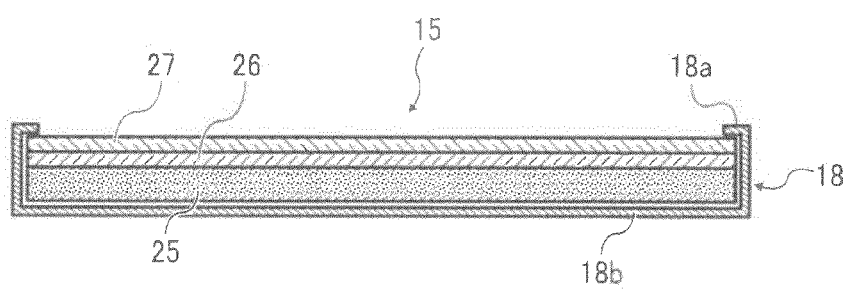
FIG. 9 is a cross-sectional view of an operation panel unit according to Example 5 of the present invention.

FIG. 9 is a cross-sectional view of an operation panel unit 15 according to Example 5 of the present invention. In Example 5, the display part 25 is supported by an exterior back surface portion 18b of the casing 18.

In the case where the display part 25 is formed of an LCD, a pressure exerted through a manipulation can be withstood because of the hardness of a glass substrate portion of the display part 25.

On the other hand, in the case where the display part 25 is formed of an electronic paper, the display part 25 as well as the solar cell part 26 and the touchscreen panel type input part 27 are unlikely to withstand a pressure exerted through a manipulation. Hence, it is desirable to support the display part 25 by the casing 18.

Use of an electronic paper for the display part 25 provides a flexibility to the stacked body formed of the solar cell part 26, the touchscreen panel type input part 27, and the display part 25 as a whole. Accordingly, the exterior back surface portion 18b, which supports the stacked body, can be formed to have an arched surface, a bowl-like surface, or similar surface, instead of a flat surface. This can bring about advantageous effects such as improvement in operability and prevention of reflection of a fluorescent lamp.
(Embodiment 6)

Figure 10:
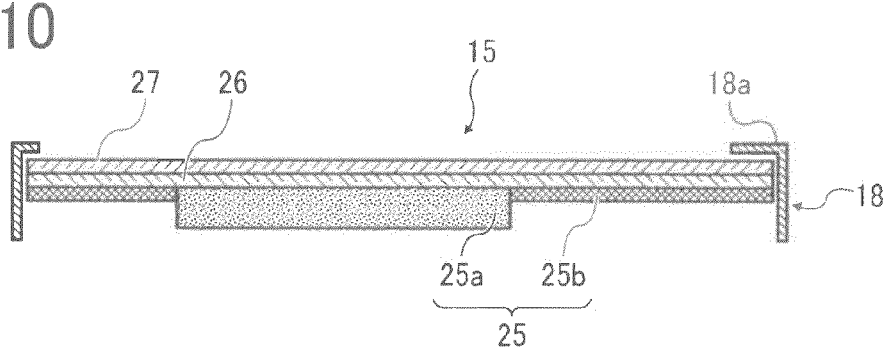
FIG. 10 is a cross-sectional view of an operation panel unit according to Example 6 of the present invention.

FIG. 10 is a cross-sectional view of an operation panel unit 15 according to Example 6 of the present invention. In Example 6, the display part 25 is constituted of a first display portion 25a and a second display portion 25b. The first display portion 25a is formed of an LCD while the second display portion 25b is formed of an electronic paper.

LCDs are superior to electronic papers in responsiveness during operation, but require a larger power consumption. Thus, to only maintain the display state during standby, the display is performed using only the electronic paper that requires a smaller power consumption.

Specifically, the first display portion 25a and the second display portion 25b may be caused to operate while the operation panel unit 15 is in operation. Only the second display portion 25b may be used for displaying while the operation panel unit 15 is standby. Then, upon detection of the operator's manipulation of the input part 27 corresponding to the second display portion 25b, the first display portion 25a and the second display portion 25b may be caused to operate.

Note that, although unillustrated, it is preferable to divide the operable region of the input part (touchscreen panel) 27 and operate only some of the operable regions as needed.
(Embodiment 7)

Figure 11:
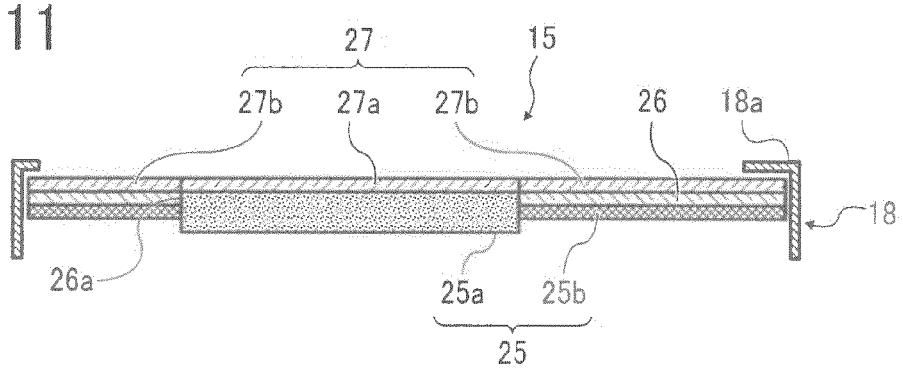
FIG. 11 is a cross-sectional view of an operation panel unit according to Example 7 of the present invention.

FIG. 11 is a cross-sectional view of an operation panel unit 15 according to Example 7 of the present invention. In Example 7, the display part 25 is constituted of the first display portion 25a and the second display portion 25b as in the case of Example 6. Moreover, as in Example 6, the first display portion 25a is formed of an LCD while the second display portion 25b is formed of an electronic paper.

An opening 26a is formed through the solar cell part 26. The first display portion 25a is in direct contact with the input part 27, and the second display portion 25b is disposed on the opposite side to the input part 27 with the solar cell part 26 therebetween.

According to Example 7, the first display portion 25a is in direct contact with a first input portion 27a. Thus, the operator can experience the same manipulation feeling as conventional cases when pressing the LCD, which is the first display portion 25a, via the input part 27.

Note that in Example 7, reference signs are given in FIG. 11 such that the first input portion 27a represents part of the input part 27 corresponding to the first display portion 25a and that a second input portion 27b represents part of the input part 27 corresponding to the second display portion 25b. However, the first input portion 27a and the second input portion 27b may be formed either integrally or separately.
(Embodiment 8)

Figure 12A:
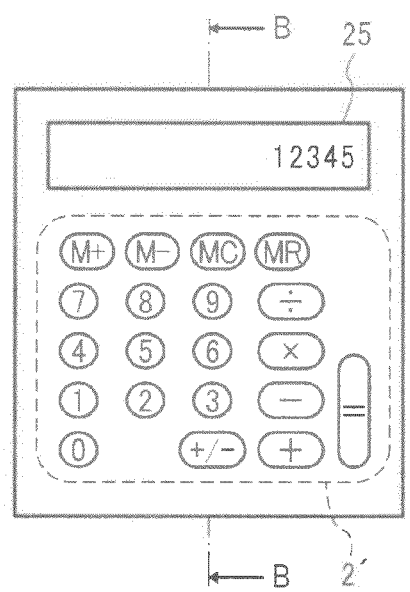
FIGS. 12A and 12B are explanatory drawings of Example 8 of the present invention.
Figure 12B:
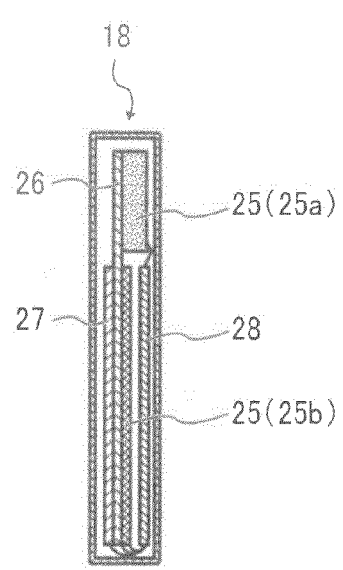

FIGS. 12A and 12B are explanatory drawings of an operation panel unit according to Example 8 of the present invention. FIG. 12A is a plan view showing an example where the operation panel 15 according to the present invention is applied to an electronic desk-top calculating apparatus (calculator). FIG. 12B is a cross-sectional view taken along the B-B line of FIG. 12A.

Figure 1:
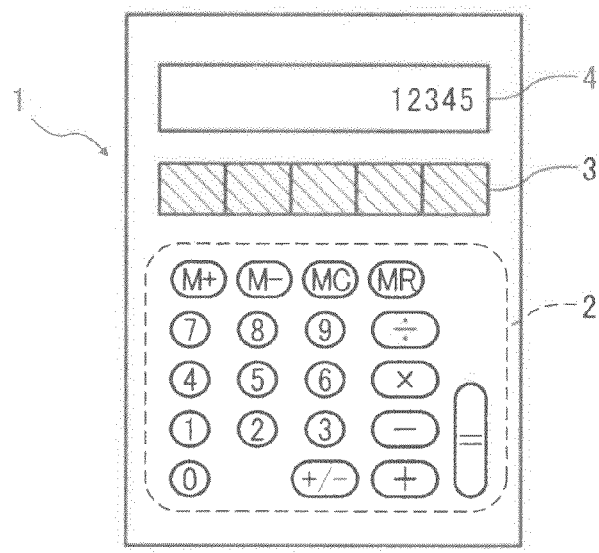
FIG. 1 is a plan view showing an example of a liquid crystal display of a conventional electronic device.

In FIGS. 12A and 12B, an operation part 2', the solar cell part 26, and the display part 25 correspond to the operation part 2, the solar cell part 3, and the display part 4 in FIG. 1, respectively.

In Example 8, the electric control circuit part 28 is provided inside the casing 18 at a position corresponding to the operation part 2'. An electronic paper as the second display portion 25b is provided on the top surface of the electric control circuit part 28. The transparent solar cell part 26 is provided on the top surface of the second display portion 25b. The touchscreen panel type input part 27 is provided on the top surface of the transparent solar cell part 26. An LCD as the first display portion 25a is provided inside the casing 18 at a position corresponding to the display part 25, which is at the back surface side of the solar cell part 26.

In the electronic desk-top calculating apparatus according to Example 8, the solar cell part 26 and the input part 27 are disposed in an overlapping manner, thereby eliminating the arrangement space for the solar cell part 3 shown in FIG. 1. As a result, the electronic desk-top calculating apparatus can be made smaller accordingly.

In FIG. 12, the configuration is such that the input part 27 does not cover the first display portion 25a. However, that if the configuration is such that the input part 27 covers the first display portion 25a, inputs corresponding to the display contents in the first display portion 25a. Moreover, what is displayed in the operation part 2' can be changed by the electronic paper, and therefore the four-function calculator shown in FIG. 12A can be switched to display for a sophisticated, scientific electronic calculator, or the like.

(Embodiment 9)

Figure 13:
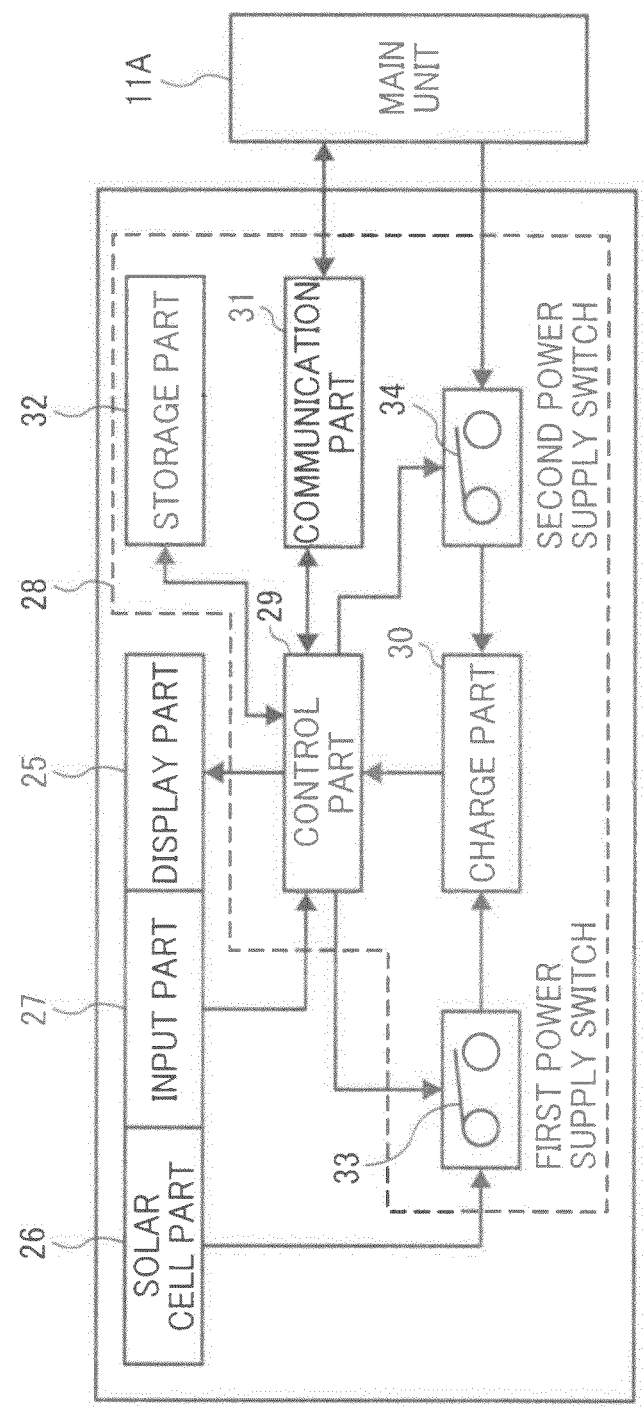
FIG. 13 is a block circuit diagram of an electronic device including the operation panel unit provided to the image forming apparatus shown in FIG. 2.
Figure 14:
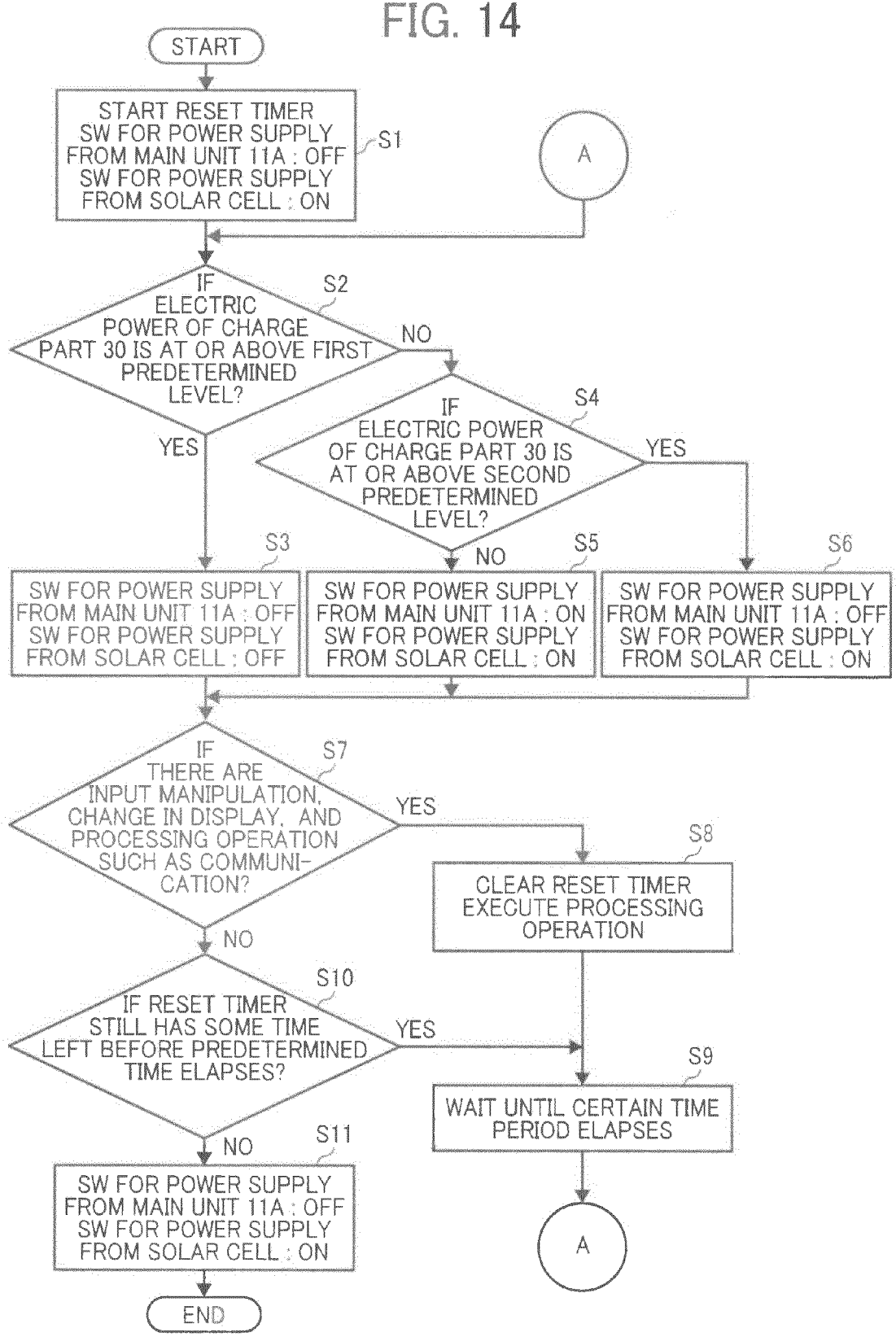
FIG. 14 is a flowchart for describing the operation of the block circuit shown in FIG. 13.

FIG. 13 shows a block circuit diagram of an operation panel unit 15 provided to the image forming apparatus shown in FIG. 2. FIG. 14 is a flowchart for describing the operation of the operation panel unit.

In FIG. 13, reference sign 28' denotes an electric control circuit part. The electric control circuit part 28' includes a control part 29, a charge part (electricity accumulation part) 30, a communication part 31, a storage part 32, a first power supply switch 33, and a second power supply switch 34. The electric power of the solar cell part 26 is supplied to the charge part 30 through the first power supply switch 33.

The storage part 32 has the same function as that of the aforementioned storage part of the electric control circuit part 28.

The charge part 30 is supplied with an electric power from a main unit 11A of the image forming apparatus 11 through the second power supply switch 34.

The electric power of the charge part 30 is supplied to the control part 29. The main unit 11A and the control part 29 exchange information with each other through the communication part 31, and also exchange information with the storage part 32.

Here, the control part 29 detects, through the input part 27, a manipulation corresponding to a display content currently displayed in the display region, and changes or controls the display state of the display part 25 on the basis of the display state information stored in the storage part 32.

Note that the control part 29 may be configured to: detect, through the input part 27, a manipulation corresponding to a display content currently displayed in the display region; notify the main unit 11A of the detection through the communication part 31; and change the display state of the display part 25 on the basis of an instruction from the main unit 11A.

The control part 29 includes a reset timer (not illustrated). For this reset timer, an appropriate time period is set in consideration of the electric power supplied to the charge part 30 from the solar cell part 26 and the natural decrease of the amount of the electric power accumulated in the charge part 30 while the operation panel unit 15 is not in operation.

As shown in FIG. 14, as the reset timer starts, the control part 29 performs control to turn off the second power supply switch 34 that supplies an electric power from the main unit 11A, and also to turn on the first power supply switch 33 so that an electric power from the solar cell part 26 can be supplied to the charge part 30 (S.1).

If the electric power supplied from the charge part 30 is at or above a first predetermined level, the judgment of the control part 29 is YES, and if the electric power is below the first predetermined level, the judgment is NO (S.2). In the case where the electric power supplied from the charge part 30 is at or above the first predetermined level, the control part 29 maintains the off state of the second power supply switch 34 so as not to supply the electric power from the main unit 11A to the charge part 30, and also turns off the first power supply switch 33 so as to stop the supply of the electric power from the solar cell part 26 to the charge part 30 (S.3).

Here, the first predetermined level corresponds to such a power state that the electric power accumulated in the charge part 30 is large enough to operate the operation panel unit 15 without supplying an electric power to the charge part 30.

If the electric power supplied from the charge part 30 is below the first predetermined level, the control part 29 then judges whether or not the electric power supplied from the charge part 30 is at or above a second predetermined level (S.4). If the electric power supplied from the charge part 30 is at or above the second predetermined level, the judgment of the control part 29 is YES, and if the electric power is below the second predetermined level, the judgment is NO.

Here, the second predetermine level is lower than the first predetermined level and corresponds to such a power state that the electric power supplied from the solar cell part 26 is large enough to operate the operation panel unit 15 without supplying an electric power from the main unit 11A to the charge part 30.

If the electric power supplied from the charge part 30 is below the second predetermined level, the control part 29 turns on both the first and second power supply switches 33 and 34 so that an electric power can be supplied to the charge part 30 from both the main unit 11A and the solar cell part 26 (S.5).

This is because it is judged that only the supply of the electric power from the solar cell 26 to the charge part 30 cannot provide an enough electric power to operate the operation panel unit 15.

In the case where the electric power supplied from the charge part 30 is at or above the second predetermined level, the control part 29 turns off the second power supply switch 34 so as to stop the supply of the electric power from the main unit 11A to the charge part 30, and turns on the first power supply switch 33 so as to supply the electric power from the solar cell part 26 to the charge part 30 (S.6).

After executing the process in S.3, S.5 or S.6, the control part 29 judges whether or not there is a manipulation inputted to the input part 27, whether or not there is a change in the display contents in the display part 25, and whether or not there is a processing operation such as communication (S.7).

If there are a manipulation of the input part 27, a change in the display contents in the display part 25, and a processing operation such as communication, the control part 29 clears the reset timer and continues the processing operation (S.8).

Then, the control part 29 waits until a certain time period elapses (S.9), and thereafter returns to S.2.

If there is not a manipulation of the input part 27, a change in the display contents in the display part 25, or a processing operation such as communication, the control part 29 then judges whether or not the reset timer still has some time left before the predetermined time elapses (S.10). Subsequently, if the reset timer still has some time left before the predetermined time elapses, the control part 29 transitions to S.9 and waits until a certain time period elapses, and thereafter transitions to S.2.

If the reset timer has elapsed the predetermined time period, the control part 29 performs control to turn off the second power supply switch 34 that supplies the electric power from the main unit 11A, and to turn on the first power supply switch 33 so that the electric power from the solar cell part 26 can be supplied to the charge part 30 (S.11).

The process loop of S.2, S.3, S.7 and S.10 by the control part 29 corresponds to a state where only the electric power accumulated in the charge part 30 is required to operate the operation panel unit 15 and also where the power consumption is low.

The configuration in Example 9 is such that the on/off of the first and second power supply switches 33 and 34 is so controlled as to stop supplying the electric power from the main unit 11A to the charge part 30 and to supply the electric power from the solar cell part 26 to the charge part 30, immediately after the reset timer starts and also immediately before the reset timer ends. However, the configuration is not limited thereto, and may be such that the charge part 30 is rapidly charged immediately after the reset timer starts, for example.

Note that the configuration is desirably such that a judgment process for turning on and off the first and second power supply switches 33 and 34 is performed while the control part 29 is waiting in S.9 for the purpose of preventing the overcharge of the charge part 30.

Even without an instruction from the main unit 11A, the control part 29 can change the display contents in the display part 25 on the basis of stored information stored in the storage part 32.

In addition, it is possible to employ a configuration in which the control part 29 transmits input information of the input part 27 to the main unit 11A and the main unit 11A instructs the control part 29 to change the display contents.

In that case, the display information for the display part 25 may be the stored information stored in the storage part 32, and information transmitted from the main unit 11A may be used as the display information displayed in the display part 25.

(Embodiment 10)

Figure 15:
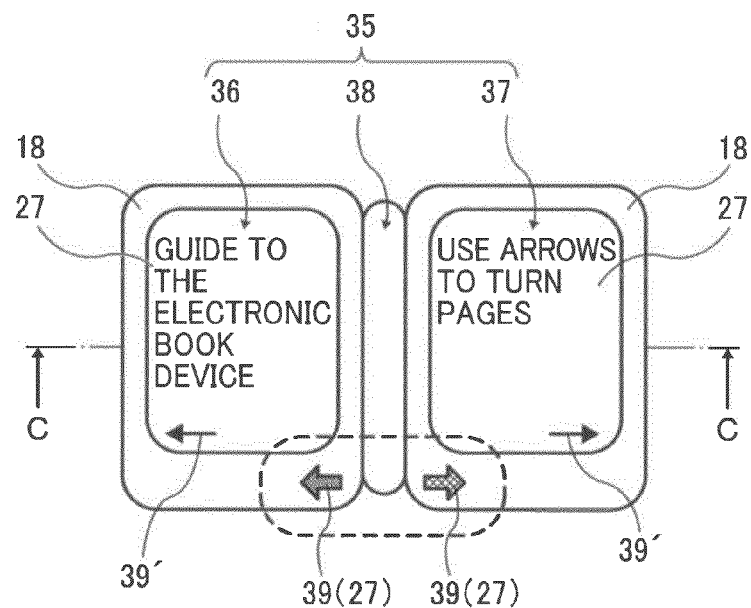
FIG. 15 is an explanatory drawing showing a case where the operation panel unit according to some of Examples of the present invention is applied to an electronic book device, and shows that a front cover body and a back cover body are in a spread state with the help of a center joining portion therebetween.
Figure 16:
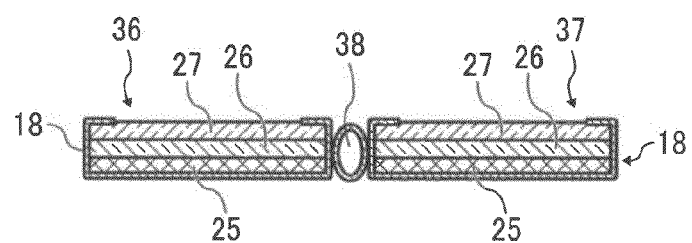
FIG. 16 is a cross-sectional view taken along the C-C line of FIG. 15.
Figure 17:
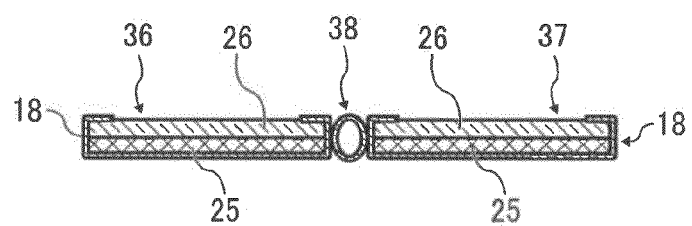
FIG. 17 is a cross-sectional view taken along the C-C line of FIG. 15, and is an explanatory drawing showing another example of the cross-sectioned electronic book device.

FIGS. 15 to 17 are explanatory drawings of an operation panel unit according to an example of the present invention, and show a case where the operation panel unit of the present invention is applied to an electronic book device.

In FIG. 15, reference sign 35 denotes the electronic book device. The electronic book device 35 is constituted of a front cover body 36 and a back cover body 37 serving as a front cover sheet and a back cover sheet, respectively.

The front cover body 36 and the back cover body 37 are joined pivotally via a center joining portion 38.

The front cover body 36 and the back cover body 37 each include the casing 18. In each casing 18, the display part 25, the solar cell part 26 and the input part 27 are arranged in this order from the bottom as shown in FIG. 16.

The center joining portion 38 is provided with the control part 29, the charge part 30 and the storage part 32.

FIG. 15 shows that the front cover body 36 and the back cover body 37 shown in FIG. 16 are in a spread state with the help of the center joining portion 38.

According to the electronic book device shown in FIG. 16, the reader can turn a page by touching the input part 27 at the top surface with his/her finger.

Moreover, it is possible to employ a configuration in which the input parts 27 are not provided at the top surfaces serving as sheet surfaces as shown in FIG. 17, but input parts 27 denoted by arrows 39 are provided to the casings 18 as shown in FIG. 15.

Note that each casing 18 is desirably made of a flexible film.

Meanwhile, arrows in FIG. 15 corresponding to a sentence "use arrows to turn pages" that is displayed in the display part 25 of the back cover body 37 and can be seen through the input part 27 thereof are displayed in the display part 25 as shown in reference signs 39' and 39', in the case of the electronic book device with the configuration shown in FIG. 16.

According to the present invention, it is possible to provide an electronic device and a display as well as an image processing apparatus and an electronic calculating apparatus using the electronic device and the display, the electronic device and the display using a light transmissive solar cell for electric power generation so as to allow a solar cell part and a display part to be disposed to overlap an input part so that a larger electric power than the conventional cases can be generated without increasing the size of the whole operation panel and the whole display.

Moreover, it is possible to improve the design freedom and also to solve our global environmental issues and energy issues.

Although the several embodiments of the present invention have been explained, it should be understood that the present invention is not limited to these embodiments, various modifications and changes can be made to these embodiments.

What is claimed is:

1. An electronic device comprising:
   an operation panel having a top surface exposed to a user and including:
      a display part capable of electrically and magnetically changing a display region and of displaying a display content displayed in the display region to the user through a display surface of the display part;
      a solar cell part that transmits light in a visible light region; and
      an input part that detects whether or not any part of the display region is manipulated, and that transmits light in a visible light region, wherein
   the display part, solar cell part and input part form layers in which the solar cell part and the input part are disposed on a display surface side of the display part and directly over the display part, such that the layers comprised of the solar cell part and the input part are positioned between the display part and the top surface, and
   electric power generated by the solar cell part allows at least one of changing of what is displayed in the display part and detecting of a manipulation of the input part to be performed.

2. The electronic device according to claim 1, wherein the solar cell part and the input part are disposed in a manner to form layers in the recited order from the display surface side of the display part toward the top surface.

3. The electronic device according to claim 1, wherein the input part and the solar cell part are disposed in a manner to form layers in the recited order from the display surface side of the display part toward the top surface.

4. The electronic device according to claim 1, further comprising:
- a storage part that holds display state information containing information on the display region and information on a display content to be displayed in the display region; and
- a display control part that detects the manipulation of the input part and changes a display state of the display part on the basis of the display state information, wherein
- the display control part detects, through the input part, a manipulation corresponding to a display content currently displayed in the display region and changes the display state of the display part on the basis of the display state information.

5. The electronic device according to claim 1, further comprising:
- a communication part that exchanges information with a main unit provided with the electronic device;
- a storage part that holds display state information containing information on the display region and information on a display content to be displayed in the display region; and a display control part, wherein
- the display control part detects, through the input part, a manipulation corresponding to a display content currently displayed in the display region, notifies the main unit of the electronic device of the detection through the communication part, and changes the display state of the display part on the basis of an instruction from the main unit of the electronic device.

6. An electronic device comprising an operation panel including:
- a display part capable of electrically and magnetically changing a display region and of displaying a display content displayed in the display region;
- a solar cell part that transmits light in a visible light region; and
- an input part that detects whether or not any part of the display region is manipulated, and that transmits light in a visible light region, wherein
- the solar cell part and the input part are disposed on a display surface side of the display part in such a manner to form layers, and
- electric power generated by the solar cell part allows at least one of changing of what is displayed in the display part and detecting of a manipulation of the input part to be performed, further comprising:
- a power accumulation part that accumulates an electric power generated by the solar cell part;
- a first power supply switch that stops and blocks supply of the electric power from the solar cell part to the power accumulation part;
- a second power supply switch that stops and blocks supply of an electric power from a main unit provided with the electronic device to the power accumulation part; and
- a control part that functions as a power detection part detecting a power accumulation state and a power consumption state of the power accumulation part, and controls the first power supply switch and the second power supply switch on the basis of a result of the detection, wherein
- the control part sets only the first power supply switch in an conducting state when an electric power of the power accumulation part is large enough to operate the operation panel,
- the control part sets also the second power supply switch in an conducting state when the electric power of the power accumulation part is not large enough to operate the operation panel, and
- the control part sets both the first and second power supply switches in a blocking state when the electric power of the power accumulation part is large enough to operate the operation panel and power consumption is low.

7. The electronic device according to claim 1, wherein
- the display part includes an LCD as a first display portion and an electronic paper as a second display portion,
- both the first display portion and the second display portion are caused to operate when the operation panel is in an operating state, and
- only the second display portion is used for displaying when the operation panel is in a standby state, and
- upon detection of a manipulation of an input part of the second display portion by an operator, the state of the operation panel transitions to the operating state.

8. An image processing apparatus comprising the electronic device according to claim 1.

9. An electronic calculating apparatus comprising the electronic device according to claim 1.

10. A display having a top surface exposed to a user, comprising:
- a display part capable of electrically and magnetically changing a display region and of displaying a display content displayed in the display region to the user through a display surface of the display part;
- a solar cell part that transmits light in a visible light region;
- a power accumulation part that accumulates an electric power generated by the solar cell part;
- an input part that detects whether or not any part of the display region in the display part is manipulated by an operator; and
- a display control part that detects the manipulation of the input part and changes a display state of the display part on the basis of display state information, wherein
- the solar cell part is disposed on a display surface side of the display part and directly over the display part, such that the solar cell part is positioned between the display part and the top surface, and
- electric power of the power accumulation part is used to operate the display control part.

11. A display having a top surface exposed to a user, comprising:
- a display part capable of electrically and magnetically changing a display region and of displaying a display content displayed in the display region to the user through a display surface of the display part;
- a solar cell part that transmits light in a visible light region;
- a power accumulation part that accumulates an electric power generated by the solar cell part;
- an input part that detects whether or not any part of the display region in the display unit is manipulated by an operator, and that transmits light in a visible light region; and
- a display control part that detects the manipulation of the input part and changes a display state of the display part on the basis of display state information, wherein
- the display part, solar cell part and input part form layers in which the solar cell part and the input part are disposed on a display surface side of the display part and directly over the display part, such that the layers comprised of the solar cell part and the input part are positioned between the display part and the top surface, and electric power of the power accumulation part is used to operate the display control part.

12. The display according to claim 10, wherein the display part is an electronic paper.

13. The display according to claim 11, wherein the display part is an electronic paper.

\* \* \* \* \*